(12) United States Patent
Laine et al.

(10) Patent No.: US 8,996,846 B2
(45) Date of Patent: Mar. 31, 2015

(54) SYSTEM, METHOD AND COMPUTER PROGRAM PRODUCT FOR PERFORMING A SCAN OPERATION

(75) Inventors: Samuli M. Laine, Vantaa (FI); Timo O. Aila, Tuusula (FI); Mark J. Harris, London (GB)

(73) Assignee: NVIDIA Corporation, Santa Clara, CA (US)

( * ) Notice: Subject to any disclaimer, the term of this patent is extended or adjusted under 35 U.S.C. 154(b) by 1883 days.

(21) Appl. No.: 11/862,938

(22) Filed: Sep. 27, 2007

(65) Prior Publication Data

US 2009/0089542 A1   Apr. 2, 2009

(51) Int. Cl.
*G06F 9/38* (2006.01)
*G06F 9/52* (2006.01)
*G06F 9/30* (2006.01)
*G06F 17/30* (2006.01)

(52) U.S. Cl.
CPC ............... *G06F 9/52* (2013.01); *G06F 9/3001* (2013.01); *G06F 9/30029* (2013.01); *G06F 9/30036* (2013.01); *G06F 9/3851* (2013.01); *G06F 9/3885* (2013.01); *G06F 9/522* (2013.01); *G06F 17/30988* (2013.01)
USPC .......................................................... 712/17

(58) Field of Classification Search
None
See application file for complete search history.

(56) References Cited

U.S. PATENT DOCUMENTS

| | | | |
|---|---|---|---|
| 4,131,947 A | 12/1978 | Armstrong | |
| 4,628,483 A | 12/1986 | Nelson | |
| 4,855,937 A | 8/1989 | Heartz | |
| 5,193,207 A | 3/1993 | Vander Vegt et al. | |
| 5,274,718 A | 12/1993 | Leonardi et al. | |
| 5,594,844 A | 1/1997 | Sakai et al. | |
| 5,621,908 A | 4/1997 | Akaboshi et al. | |
| 5,650,862 A | 7/1997 | Shimizu et al. | |
| 5,793,379 A | 8/1998 | Lapidous | |
| 5,963,212 A | 10/1999 | Bakalash | |
| 6,028,987 A | 2/2000 | Hirairi | |
| 6,065,005 A | 5/2000 | Gal et al. | |
| 6,489,955 B1 | 12/2002 | Newhall, Jr. | |

(Continued)

FOREIGN PATENT DOCUMENTS

| | | |
|---|---|---|
| CN | 1202651 A | 12/1998 |
| CN | 1431588 A | 7/2003 |

(Continued)

OTHER PUBLICATIONS

W. Daniel Hillis, Guy L. Steele, Jr.; Communications of the ACM archive vol. 29, Issue 12 (Dec. 1986) Special issue on parallelism pp. 1170-1183.*

(Continued)

*Primary Examiner* — Andrew Caldwell
*Assistant Examiner* — John Lindlof
(74) *Attorney, Agent, or Firm* — Zilka-Kotab, PC (57) ABSTRACT

A system, method, and computer program product are provided for efficiently performing a scan operation. In use, an array of elements is traversed by utilizing a parallel processor architecture. Such parallel processor architecture includes a plurality of processors each capable of physically executing a predetermined number of threads in parallel. For efficiency purposes, the predetermined number of threads of at least one of the processors may be executed to perform a scan operation involving a number of the elements that is a function (e.g. multiple, etc.) of the predetermined number of threads.

22 Claims, 5 Drawing Sheets

(56) References Cited

U.S. PATENT DOCUMENTS

| | | | |
|---|---|---|---|
| 6,518,971 | B1 | 2/2003 | Pesto, Jr. et al. |
| 6,549,907 | B1 | 4/2003 | Fayyad et al. |
| 6,556,200 | B1 | 4/2003 | Pfister et al. |
| 6,633,882 | B1 | 10/2003 | Fayyad et al. |
| 6,738,518 | B1 | 5/2004 | Minka et al. |
| 6,825,839 | B2 | 11/2004 | Huang et al. |
| 6,879,980 | B1 | 4/2005 | Kothuri et al. |
| 7,146,486 | B1 | 12/2006 | Prokopenko et al. |
| 7,194,125 | B2 | 3/2007 | Vlasic et al. |
| 7,348,975 | B2 | 3/2008 | Reshetov et al. |
| 7,580,927 | B1 | 8/2009 | Abugov et al. |
| 7,616,782 | B2 | 11/2009 | Badawy |
| 7,903,125 | B1 | 3/2011 | Ayers et al. |
| 7,986,810 | B2 | 7/2011 | Badawy |
| 8,065,288 | B1 | 11/2011 | Garland et al. |
| 8,081,198 | B1 | 12/2011 | Ayers et al. |
| 8,243,083 | B1 | 8/2012 | Garland et al. |
| 8,264,484 | B1 | 9/2012 | Lauterbach et al. |
| 8,284,188 | B1 | 10/2012 | Lauterbach et al. |
| 8,321,492 | B1 | 11/2012 | Sengupta et al. |
| 8,661,266 | B2 | 2/2014 | Hakkarainen et al. |
| 8,773,422 | B1 | 7/2014 | Garland et al. |
| 2002/0120949 | A1 | 8/2002 | Allen |
| 2003/0028509 | A1 | 2/2003 | Sah et al. |
| 2003/0081833 | A1 | 5/2003 | Tilton |
| 2004/0210596 | A1 | 10/2004 | Budd et al. |
| 2005/0001844 | A1 | 1/2005 | Naegle |
| 2005/0144602 | A1 | 6/2005 | Ngai et al. |
| 2005/0177564 | A1 | 8/2005 | Kobayashi et al. |
| 2006/0184768 | A1 | 8/2006 | Bishop et al. |
| 2007/0106989 | A1 | 5/2007 | Kissell |
| 2007/0159488 | A1 | 7/2007 | Danskin et al. |
| 2007/0165035 | A1 | 7/2007 | Duluk, Jr. et al. |
| 2007/0169042 | A1 | 7/2007 | Janczewski |
| 2007/0182732 | A1 | 8/2007 | Woop et al. |
| 2007/0260663 | A1 | 11/2007 | Frigo et al. |
| 2007/0264023 | A1 | 11/2007 | Gorrell et al. |
| 2008/0005547 | A1 | 1/2008 | Papakipos et al. |
| 2008/0043018 | A1 | 2/2008 | Keller et al. |
| 2008/0154928 | A1 | 6/2008 | Bashyam et al. |
| 2008/0316214 | A1* | 12/2008 | Peeper .......................... 345/501 |
| 2009/0089542 | A1 | 4/2009 | Laine et al. |
| 2009/0106530 | A1 | 4/2009 | Lauterbach et al. |
| 2009/0132878 | A1 | 5/2009 | Garland et al. |
| 2010/0076941 | A1 | 3/2010 | Dotsenko et al. |

FOREIGN PATENT DOCUMENTS

| | | |
|---|---|---|
| WO | WO2007082042 A2 | 7/2007 |
| WO | 2008/127610 | 10/2008 |
| WO | 2008/127622 | 10/2008 |
| WO | 2008/127623 | 10/2008 |

OTHER PUBLICATIONS

Popov et al., "Stackless KD-Tree Traversal for High Performance GPU Ray Tracing," Eurographics 2007, vol. 26 (2007), No. 3.
Johannes Günther, Stefan Popov, Hans-Peter Seidel, and Philipp Slusallek. "Realtime Ray Tracing on GPU with BVH-based Packet Traversal." Proceedings of the IEEE/Eurographics Symposium on Interactive Ray Tracing 2007, pp. 113-118. http://www.mpi-inf.mpg.de/~guenther/BVHonGPU/BVHonGPU.pdf.
U.S. Appl. No. 11/940,782, filed Nov. 15, 2007.
U.S. Appl. No. 11/927,099, filed Oct. 29, 2007.
U.S. Appl. No. 11/862,938, filed Sep. 27, 2007.
U.S. Appl. No. 11/942,608, filed Nov. 19, 2007.
S.-E. Yoon, P. Lindstrom, V. Pascucci. and D. Manocha. "Cache-oblivious mesh layouts." ACM Transactions on Graphics, Proc. SIGGRAPH 2005, 24(3), Jul. 2005.
U.S. Appl. No. 11/938,091, filed Nov. 9, 2007.
U.S. Appl. No. 11/874,093, filed Oct. 17, 2007.
I. Kamel and C. Faloutsos. "On Packing R-trees." In Proc. 2nd Int'l Conf. on Information & Knowledge Management, Nov. 1993.
V. Pascucci and R. Frank. "Global Static Indexing for Real-time Exploration of Very Large Regular Grids." In Proc. Supercomputing 2001, Nov. 2001.
C. Wächter and A. Keller. "Instant Ray Tracing: The Bounding Interval Hierarchy," In Proc. Eurographics Symposium on Rendering Techniques, Apr. 2006.
Horn et al., "Interactive k-D Tree GPU Raytracing," graphics.stanford.edu/papers/i3dkdtree/i3dkdtreeonline.ppt.
Ingo Wald. Realtime Ray Tracing and Interactive Global Illumination. Ph.D. dissertation, Universität des Saarlandes, 2004. http://www.sci.utah.edu/~wald/Publications/2004/WaldPhD/download/phd.pdf.
G. Blelloch, 1990. Vector Models for Data-Parallel Computing. MIT Press, ISBN 0-262-02313-X, 1990. http://www.cs.cmu.edu/~guyb/papers/Ble90.pdf.
Thinking Machines Corp., 1990. Connection Machine Model CM-2 Technical Summary. Version 6.0, Nov. 1990.
V. Havran. "Heuristic Ray Shooting Algorithms." Ph.D. thesis, Czech Technical University, Nov. 2000.
Sengupta et al., "Scan Primitives for GPU Computing," Proceedings of Graphics Hardware 2007, San Diego, CA, Aug. 4-5, 2007.
Harris et al., "Parallel Prefix Sum Scan with CUDA," to appear in GPU Gems 3, Hubert Nguyen, ed., Addison-Wesley, 2007.
Blelloch, "Prefix Sums and Their Applications," Carnegie Mellon University School of Computer Science, Technical Report CMU-CS-90-190, Nov. 1990.
German Office Action from application No. 10 2008 031 998.8-53 dated Mar. 9, 2010.
Sengupta, S.; Harris, M.; Zhang Y.; Owens, J.: Scan primitives for GPU computing, SIGGRAPH/EUROGRAPHICS Conference on Graphics Hardware, Proceedings of the 22nd ACM SIGGRAPH/EUROGRAPHICS symposium on Graphics hardware, San Diego, California, Session: Programming and algorithms, pp. 97-106, Aug. 2007.
Chinese Office Action Summary from application No. 200810145892.9 dated Apr. 15, 2010.
Final Office Action Summary from U.S. Appl. No. 11/942,608 mailed on May 10, 2010.
Advisory Action from U.S. Appl. No. 11/950,245, dated Aug. 16, 2011.
Notice of Allowance from U.S. Appl. No. 11/938,091, dated Aug. 24, 2011.
Advisory Action from U.S. Appl. No. 11/950,193, dated Oct. 3, 2011.
Non-Final Office Action from U.S. Appl. No. 12/333,255, dated Oct. 11, 2011.
Arvo et al., "Fast Ray Tracing by Ray Classification," ACM, Computer Graphics, Jul. 1987, vol. 21, No. 4, pp. 55-64.
Blelloch, G. E., "Programming Parallel Algorithms," Communications of the ACM, Mar. 1996, vol. 39, No. 3, pp. 85-97.
Blelloch, G. E. et al., "Implementation of a Portable Nested Data-Parallel Language," Journal of Parallel and Distributed Computing, Apr. 1994, 21(1), pp. 4-14.
Chatterjee, S. et al., "Scan Primitives for Vector Computers," Proceedings of Supercomputing '90, Nov. 12-16, 1990, pp. 666-675.
Dotsenko, Y. et al., "Fast Scan Algorithms on Graphics Processors," International Conference on Supercomputing, Jun. 7-12, 2008, pp. 205-213.
Gibbons, P. B., "A More Practical PRAM Model," ACM Symposium on Parallel Algorithms and Architectures—SPAA, 1989, pp. 158-168.
Gottschalk et al., "OBBTree: A Hierarchical Structure for Rapid Interference Detection," ACM, Proceedings of the 23rd Annual Conference on Computer Graphics and Interactive Techniques, 1996, vol. 30, pp. 171-180.
Hensley, J. et al., "Fast Summed-Area Table Generation and its Applications," EUROGRAPHICS 2005, 2005, vol. 24, No. 3, pp. 1-9.
Horn, D., "Stream Reduction Operations for GPGPU Applications," GPU Gems 2: Programming Techniques for High-Performance Graphics and General-Purpose Computation, Chapter 36, Second Printing, Apr. 2005, retrieved from http://http.developer.nvidia.com/GPUGems2/gpugems2_chapter36.html on Jul. 12, 2011, pp. 1-11.

(56) References Cited

OTHER PUBLICATIONS

Iverson, K. E., "A Programming Language," John Wiley & Sons, Fourth Printing, May 1967, pp. vii-xxi and 1-286.
Lindholm, E. et al., "NVIDIA Tesla: A Unified Graphics and Computing Architecture," IEEE Micro, Mar.-Apr. 2008, pp. 39-55.
Nickolls, J. et al., "Scalable Parallel Programming with CUDA," ACM Queue, Mar.-Apr. 2008, pp. 42-53.
Reshetov, A. et al., "Multi-Level Ray Tracing Algorithm," ACM Transactions on Graphics (TOG), Proceedings of ACM SIGGRAPH 2005, Jul. 2005, vol. 24, Issue 3, pp. 1176-1185.
Roger, D. et al. "Whitted Ray-Tracing for Dynamic Scenes using a Ray-Space Hierarchy on the GPU," Eurographics Symposium on Rendering, Jun. 2007, pp. 99-110.
Sato, K. et al. "Implementing the PRAM Algorithms in the Multithread Architecture and Evaluating the Performance," Information Processing Society of Japan, Mar. 20, 1998, pp. 39-46 (English abstract only) cited in Japanese OA Jun. 8, 2010.
Schwartz, J. T., "Ultracomputers," ACM Transactions on Programming Languages and Systems, Oct. 1980, vol. 2, No. 4, pp. 484-521.
Sengupta, S. et al., "A Work-Efficient Step Efficient Prefix-Sum Algorithm," Proceedings of the Workshop on Edge Computing Using New Commodity Architectures, 2006, pp. 1-2.
Sengupta, S. et al., "Data-Parallel GPU Computing," May 31, 2008, pp. 1-28.
Stratton, J. A. et al., "MCUDA: An Efficient Implementation of CUDA Kernels on Multi-Cores," IMPACT Technical Report, IMPACT-08-01, Mar. 12, 2008, pp. 1-18.
Wald, I. et al., "Interactive Rendering with Coherent Ray Tracing," EUROGRAPHICS 2001, 2001, vol. 20, No. 3, pp. 153-164.
Wald, I. et al., "SIMD Ray Stream Tracing—SIMD Ray Traversal with Generalized Ray Packets and On-the-fly Re-Ordering," SCI Institute Technical Report, UUSCI-2007-012, Aug. 2, 2007, pp. 1-8.
Wald, I., "On Fast Construction of SAH-based Bounding Volume Hierarchies," IEEE Symposium on Interactive Ray Tracing, 2007, pp. 33-40.
Zagha et al., "Radix Sort for Vector Multiprocessors," Proceedings of the 1991 ACM/IEEE Conference on Supercomputing, 1991, pp. 712-721.
Advisory Action from U.S. Appl. No. 11/942,608, dated Feb. 12, 2014.
Advisory Action from U. S. Appl. No. 11/950,245, dated Aug. 16, 2011.
Non-Final Office Action from U.S. Appl. No. 11/950,193, dated Jan. 17, 2013.
Office Action from Chinese Patent Application No. 200810172720.0, dated May 6, 2014.
Non-Final Office Action from U.S. Appl. No. 11/938,091, dated Mar. 2, 2010.
Non-Final Office Action from U.S. Appl. No. 11/940,782, dated May 20, 2010.
Non-Final Office Action from U.S. Appl. No. 11/942,608, dated Dec. 18, 2009.
Non-Final Office Action from U.S. Appl. No. 11/950,245, dated Oct. 5, 2010.
Non-Final Office Action from U.S. Appl. No. 12/333,244, dated Jun. 1, 2012.
Notice of Allowance from U.S. Appl. No. 12/333,255, dated Apr. 11, 2012.
Notice of Final Rejection from Japanese Patent Application No. 2008-263158, dated Nov. 16, 2010.
Notice of Preliminary Rejection from Korean Application No. 10-2008-113250, dated Dec. 17, 2010.
Notice of Preliminary Rejection from Korean Patent Application No. 10-2008-113250, dated May 28, 2010.
Notice of Allowance from U.S. Appl. No. 11/927,159, dated May 10, 2012.
Notice of Allowance from U.S. Appl. No. 11/927,099, dated Jun. 27, 2012.
Non-Final Office Action from U.S. Appl. No. 11/950,245, dated Oct. 9, 2012.
Notice of Allowance from U.S. Appl. No. 12/333,244, dated Aug. 23, 2012.
Notice of Preliminary Rejection from Korean Patent Application No. 10-2008-94936, dated Feb. 26, 2010.
NVIDIA Corporation, "NVIDIA CUDA Programming Guide," Nov. 29, 2007, Version 1.1, pp. ii-xiii and 1-128.
Office Action from Taiwan Patent Application No. 097143617, dated Jul. 16, 2012.
Final Office Action from U.S. Appl. No. 11/950,245, dated Apr. 25, 2013.
Non-Final Office Action from U.S. Appl. No. 11/942,608, dated Jun. 17, 2013.
Final Office Action from U.S. Appl. No. 11/950,193, dated Jun. 3, 2013.
Advisory Action from U.S. Appl. No. 11/950,193, dated Aug. 13, 2013.
Advisory Action from U.S. Appl. No. 11/950,245, dated Aug. 9, 2013.
Notice of Allowance from U.S. Appl. No. 11/940,782, dated Oct. 30, 2013.
Non-Final Office Action from U.S. Appl. No. 11/942,608, dated Nov. 18, 2013.
Non-Final Office Action from U.S. Appl. No. 11/950,245, dated Sep. 26, 2013.
Notice of Allowance from U.S. Appl. No. 11/950,193, dated Dec. 19, 2013.
Final Office Action from U.S. Appl. No. 11/950,245, dated Mar. 13, 2014.
U.S. Appl. No. 11/927,159, filed Oct. 29, 2007.
U.S. Appl. No. 12/333,244, filed Dec. 11, 2008.
U.S. Appl. No. 11/950,245, filed Dec. 4, 2007.
U.S. Appl. No. 12/333,255, filed Dec. 11, 2008.
U.S. Appl. No. 11/950,193, filed Dec. 4, 2007.
Final Office Action from U.S. Appl. No. 11/950,245, dated May 25, 2011.
Final Office Action from U.S. Appl. No. 11/950,193, dated Jul. 22, 2011.
Final Office Action from U.S. Appl. No. 11/927,099, dated Jun. 1, 2011.
Final Office Action from U.S. Appl. No. 11/927,159, dated May 26, 2011.
Advisory Action from U.S. Appl. No. 11/942,608, dated Jul. 18, 2011.
Final Office Action from U.S. Appl. No. 11/942,608, dated Apr. 29, 2011.
Final Office Action from U.S. Appl. No. 11/938,091, dated Oct. 14, 2010.
Non-Final Office Action from U.S. Appl. No. 11/942,608, dated Nov. 4, 2010.
Non-Final Office Action from U.S. Appl. No. 11/950,193, dated Feb. 3, 2011.
Final Office Action from U.S. Appl. No. 11/940,782, dated Sep. 16, 2010.
Non-Final Office Action from U.S. Appl. No. 10/927,099, dated Oct. 4, 2010.
Non-Final Office Action from U.S. Appl. No. 11/927,159, dated Sep. 17, 2010.

* cited by examiner

SYSTEM, METHOD AND COMPUTER PROGRAM PRODUCT FOR PERFORMING A SCAN OPERATION

FIELD OF THE INVENTION

The present invention relates to parallel processor architectures, and more particularly to executing computational algorithms using parallel processor architectures.

BACKGROUND

Parallel processor architectures are commonly used to perform a wide array of different computational algorithms. An example of an algorithm that is commonly performed using such architectures is a scan operation (e.g. "all-prefix-sums" operation, etc.). One such scan operation is defined in Table 1.

TABLE 1

$[I, a_0, (a_0 \oplus a_1), \ldots, (a_0 \oplus a_1 \oplus \ldots \oplus a_{n-1})]$, Specifically, given an array $[a_0, a_1, \ldots, a_{n-1}]$ and "I" being an identity element for the operator, the array of Table 1 is returned. For example, if the operator "$\oplus$" is an addition operator, performing the scan operation on the array [3 1 7 0 4 1 6 3] would return [3 4 11 11 15 16 22], and so forth. While an addition operator is set forth in the above example, such operator may be any binary associative operator that operates upon two operands.

To efficiently perform such scan operation oil arrays with a large number of elements, the elements may be traversed in a "tree"-like manner. For example, the elements may be viewed as "leaves" which are processed at a first level to generate and temporarily store a second level of elements which include sums of the first elements, etc. Thereafter, such second level of elements may be processed in a similar manner, and so on until a root has been reached.

To accommodate such processing using a parallel processor architecture, each array element is assigned to a particular thread of a processor. There are typically a limited number of processors each with a limited number of threads (that often amount to far less than the number of array elements). Further, since the threads share data from one level to the next, each of the foregoing levels of processing must be completely finished before moving onto the next level, etc.

This, in turn, requires a synchronization at each level of processing. In other words, the scan operation must wait for the threads to be assigned and complete the processing of each of the array elements at a particular level before moving on to the next level. For instance, given 1024 elements that are being operated upon by 32 threads capable of operating on 1 element/clock cycle, the above algorithm must wait 32 clock cycles before moving on to the next level of processing. In use, the foregoing synchronization potentially results in idle threads and additional latency.

DETAILED DESCRIPTION

Figure 1:
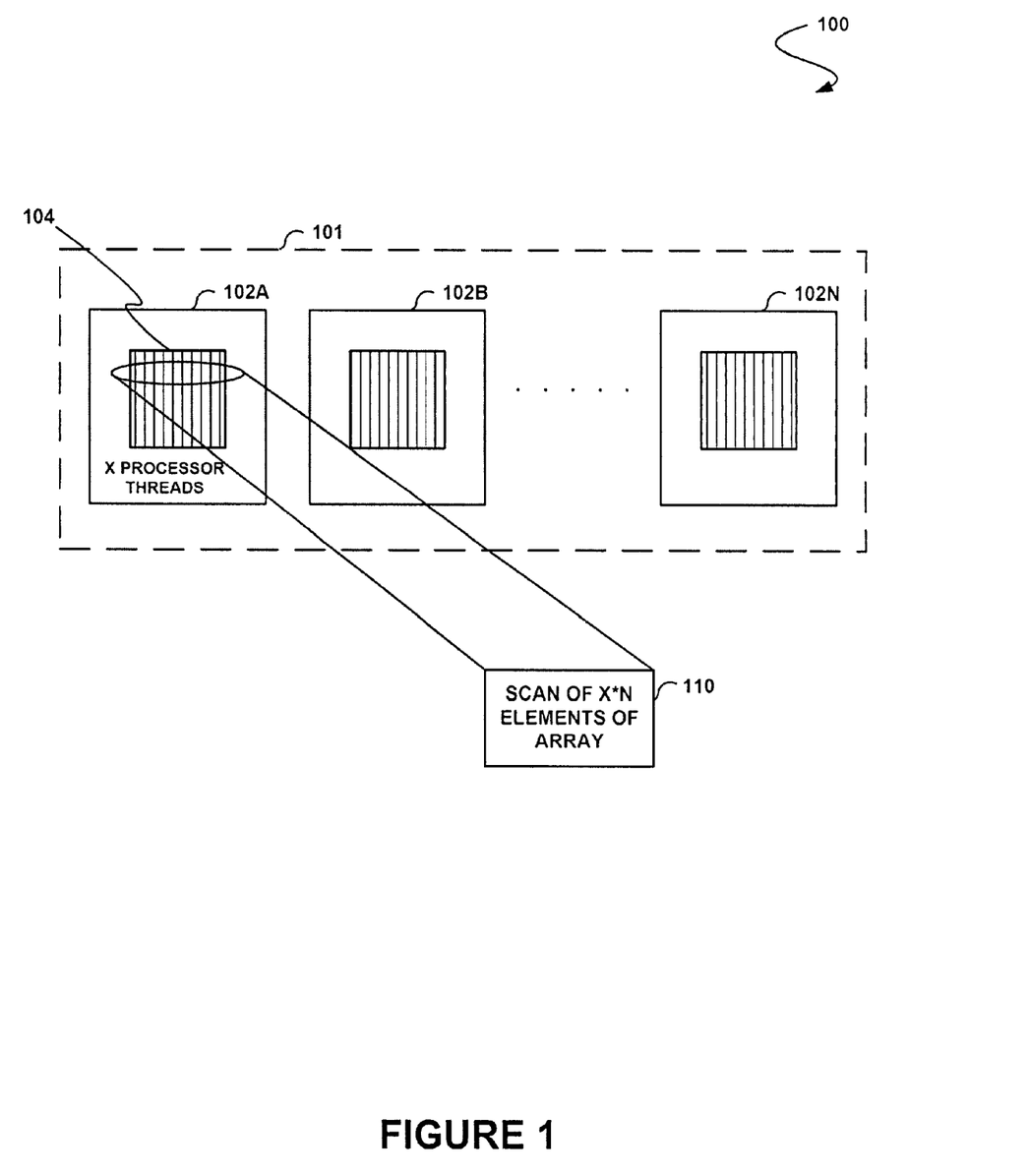
FIG. 1 shows a system for efficiently performing a scan operation utilizing a parallel processor architecture, in accordance with one embodiment of the invention.

FIG. 1 shows a system 100 for efficiently performing a scan operation utilizing a parallel processor architecture 101, in accordance with one embodiment of the invention. In the context of the present description, the parallel processor architecture may include any architecture that includes two or more processors 102A-N that operate in parallel. In one embodiment, such parallel processor architecture may take the form of a graphics processor [e.g. graphics processing unit (GPU), etc.], or a central processor unit (CPU) or chipset equipped with graphics processing capabilities. Of course, however, other embodiments are contemplated where the parallel processor architecture takes other forms as well (e.g. a general computing processor, etc.).

As further shown, the multiple processors of the parallel processor architecture are each capable of physically executing a predetermined number of threads 104 in parallel. In one embodiment, such physical execution of threads refers to a number of threads that is capable of being physically executed at the same time, as opposed to logically executed (e.g. using time slicing techniques, etc.).

As an option, the threads of each processor may operate in a single-instruction-multiple-data (SIMD) fashion. In other words, all of the threads of the processor may execute the same instruction at the same time, but oil different data. In one embodiment, this set of threads operating in such fashion may be referred to as a "warp." Further, the predetermined number of threads may refer to a "warp size" of the corresponding processor.

In use, an array of elements is traversed by utilizing the parallel processor architecture. In the context of the present description, such array of elements may include any set of values that is capable of being subjected to a scan operation. For example, in one embodiment, the array of values may be generically represented by the expression [A, B, C . . . N], where the values shown are numerical values. Of course, such element array is set forth for illustrative purposes only and should not be construed as limiting in any manner whatsoever.

During the traversal of the array elements, a scan operation may be performed. In the context of the present description, the scan operation may refer to any operation that involves a current element and at least one previous element of the array (if available). In one embodiment, the scan operation may include an all-prefix-sums operation. More information regarding an exemplary all-prefix-sums operation will be set forth during the description of a different embodiment illustrated in FIG. 2. Of course, other scan operations (e.g. involving more or less elements and other operators, etc.) are contemplated insofar as they meet the above definition.

For efficiency purposes, the predetermined number of threads of at least one of the processors may be executed to perform a scan operation involving a number of the elements that is a function of the predetermined number of threads (e.g. the aforementioned "warp size," etc.). For example, in one embodiment, the predetermined number of threads may be executed to perform a scan operation involving a number of the elements that is a multiple of the predetermined number. In the context of the present description, the aforementioned multiple of the predetermined number of threads may include any integer (e.g. 1, 2, 3, 4, 5 . . . N, etc.). In the embodiment shown in FIG. 1, the scan operation may involve a number of elements that is equal to the predetermined number of threads (i.e. the multiple equals 1).

In any case, each of the threads of a particular processor may be assigned an element for performing the relevant scan operation. To this end, processing associated with synchronization among the threads may be reduced, if not avoided all together. In other words, as a result of the above design, each thread may be assigned exactly one element to perform the scan operation upon, such that all of the threads of a particular processor may terminate at the same time. As an option, the array of elements may be traversed utilizing an optional XOR operation or the like, for providing additional efficiencies.

More illustrative information will now be set forth regarding various optional architectures and features with which the foregoing framework may or may not be implemented, per the desires of the user. Specifically, at least one additional embodiment will be set forth that traverses the element array using an XOR operation, in conjunction with the scan operation. It should be strongly noted that the following information is set forth for illustrative purposes and should not be construed as limiting in any manner. Any of the following features may be optionally incorporated with or without the exclusion of other features described.

Figure 2:
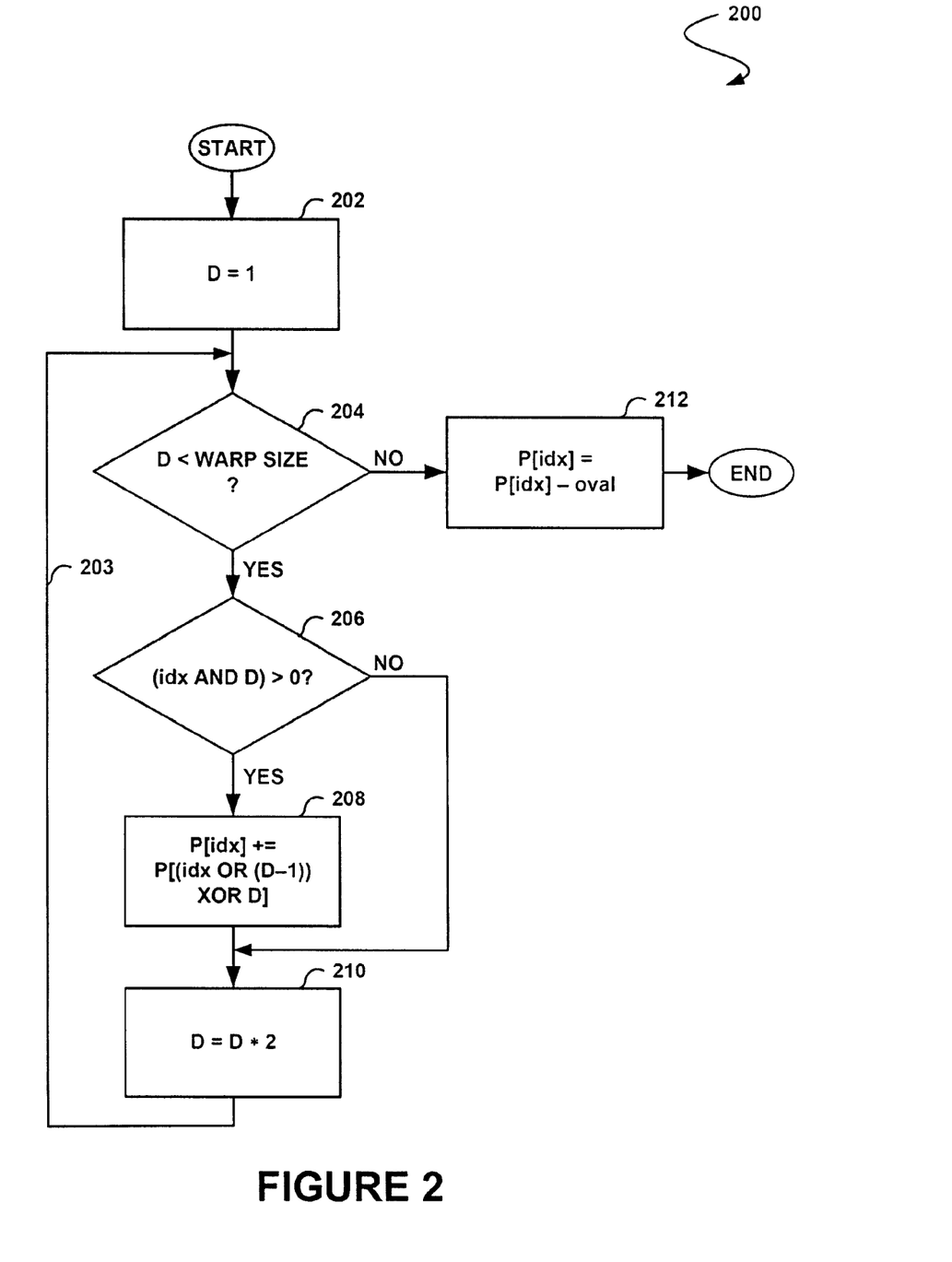
FIG. 2 shows a method for performing an XOR scan operation on an array, in accordance with another embodiment of the present invention.

FIG. 2 shows a method 200 for performing an XOR scan operation on an array P, in accordance with another embodiment of the present invention. As an option, the present method may be implemented in the context of the functionality and architecture of FIG. 1. For example, the present method may be carried out across multiple array elements in parallel by the threads of a particular processor in a parallel processor architecture such as that shown in FIG. 1. Of course, however, the method may be carried out in any desired environment (e.g. without the design criteria of FIG. 1, etc.). It should also be noted that the aforementioned definitions may apply during the present description.

As shown, the method begins by initializing a variable D by setting the same to "1." See operation 202. Of course, such initialization is optional and, if present, may be performed in any desired manner. Next, the method continues in a while loop 203 until the variable D reaches a warp size. See decision 204.

Again, such warp size refers to a predetermined number of threads capable of physically running in parallel on a particular processor of a parallel processor architecture. Further, synchronization may not necessarily be required within the while loop. Specifically, by limiting a number of array elements to be less than or equal to the warp size, synchronization is not necessarily required amongst the threads. As mentioned earlier, such synchronization involves a situation where the scan operation must wait for the threads to be assigned and complete the processing of each of the array elements at a particular level before moving on to the next level, etc. To this end, the present lock step design potentially avoids a situation where a first thread is not finished writing to a shared portion of memory where a subsequent thread needs to read or write, etc.

As will soon become apparent, the variable D increases by a factor of two for each iteration of the while loop 203. By incrementing the variable D as a factor of two in such manner, the array is processed as a binary tree. In such context, the variable D correlates with a level of such tree.

During use while the variable D remains less than the warp size, a conditional branch proceeds as shown in operations 206-208. Specifically, it is first determined if a bitwise AND operation involving the variable D and a thread-local variable idx is greater than "0." See decision 206. Such thread-local variable idx refers to a global index of a particular thread amongst a plurality of active threads. In one embodiment, idx may include a local variable that is assigned to a thread during use. Such thread-local variable may be assigned by hardware and may further be tracked/stored in a register.

Table 2 illustrates the results of decision 206 over different values of D and idx.

TABLE 2

D = 1: (idx AND D) > 0 when idx = 1, 3, 5, 7, etc.
D = 2: (idx AND D) > 0 when idx = 2, 3, 6, 7, etc.
D = 4: (idx AND D) > 0 when idx = 4, 5, 6, 7, 12, 13, 14, 15, etc.
D = 8: (idx AND D) > 0 when idx = 8, 9, 10, 11, 12, 13, 14, 15, 24, 25, etc.

If the bitwise AND operation is greater than "0" per decision 206, a particular element of the array P is updated. Specifically, only odd elements are updated by the corresponding threads at a lowest level of the tree and so on, as set forth above in Table 2.

Upon the bitwise AND operation being greater than "0" per decision 206, the particular element P[idx] of the array P is updated based on Expression #1 below.

$$P[idx] \mathrel{+}= P[(idx\ OR\ (D-1))\ XOR\ D] \qquad \text{Expression \#1}$$

The value of such array element P[idx] is shown to be a function of both a bitwise OR operation involving the values of variable idx and (D−1), as well as a bitwise XOR of such result and the value of variable D.

Table 3 illustrates a summary of the various elements summed into P[idx] for various values of idx and D.

TABLE 3

| | Element summed into P[idx] for: | | | | |
|---|---|---|---|---|---|
| idx = | D = 1 | D = 2 | D = 4 | D = 8 | D = 16 |
| 0 | — | — | — | — | — |
| 1 | 0 | — | — | — | — |
| 2 | — | 1 | — | — | — |
| 3 | 2 | 1 | — | — | — |
| 4 | — | — | 3 | — | — |
| 5 | 4 | — | 3 | — | — |
| 6 | — | 5 | 3 | — | — |
| 7 | 6 | 5 | 3 | — | — |
| 8 | — | — | — | 7 | — |
| 9 | 8 | — | — | 7 | — |
| 10 | — | 9 | — | 7 | — |
| 11 | 10 | 9 | — | 7 | — |
| 12 | — | — | 11 | 7 | — |
| 13 | 12 | — | 11 | 7 | — |
| 14 | — | 13 | 11 | 7 | — |
| 15 | 14 | 13 | 11 | 7 | — |
| 16 | — | — | — | — | 15 |
| 17 | 16 | — | — | — | 15 |
| 18 | — | 17 | — | — | 15 |
| 19 | 18 | 17 | — | — | 15 |
| 20 | — | — | 19 | — | 15 |
| 21 | 20 | — | 19 | — | 15 |
| 22 | — | 21 | 19 | — | 15 |
| 23 | 22 | 21 | 19 | — | 15 |
| 24 | — | — | — | 23 | 15 |
| 25 | 24 | — | — | 23 | 15 |
| 26 | — | 25 | — | 23 | 15 |
| 27 | 26 | 25 | — | 23 | 15 |
| 28 | — | — | 27 | 23 | 15 |

TABLE 3-continued

| | Element summed into P[idx] for: | | | | |
|---|---|---|---|---|---|
| idx = | D = 1 | D = 2 | D = 4 | D = 8 | D = 16 |
| 29 | 28 | — | 27 | 23 | 15 |
| 30 | — | 29 | 27 | 23 | 15 |
| 31 | 30 | 29 | 27 | 23 | 15 |
| etc. | | | | | |

Figure 3:
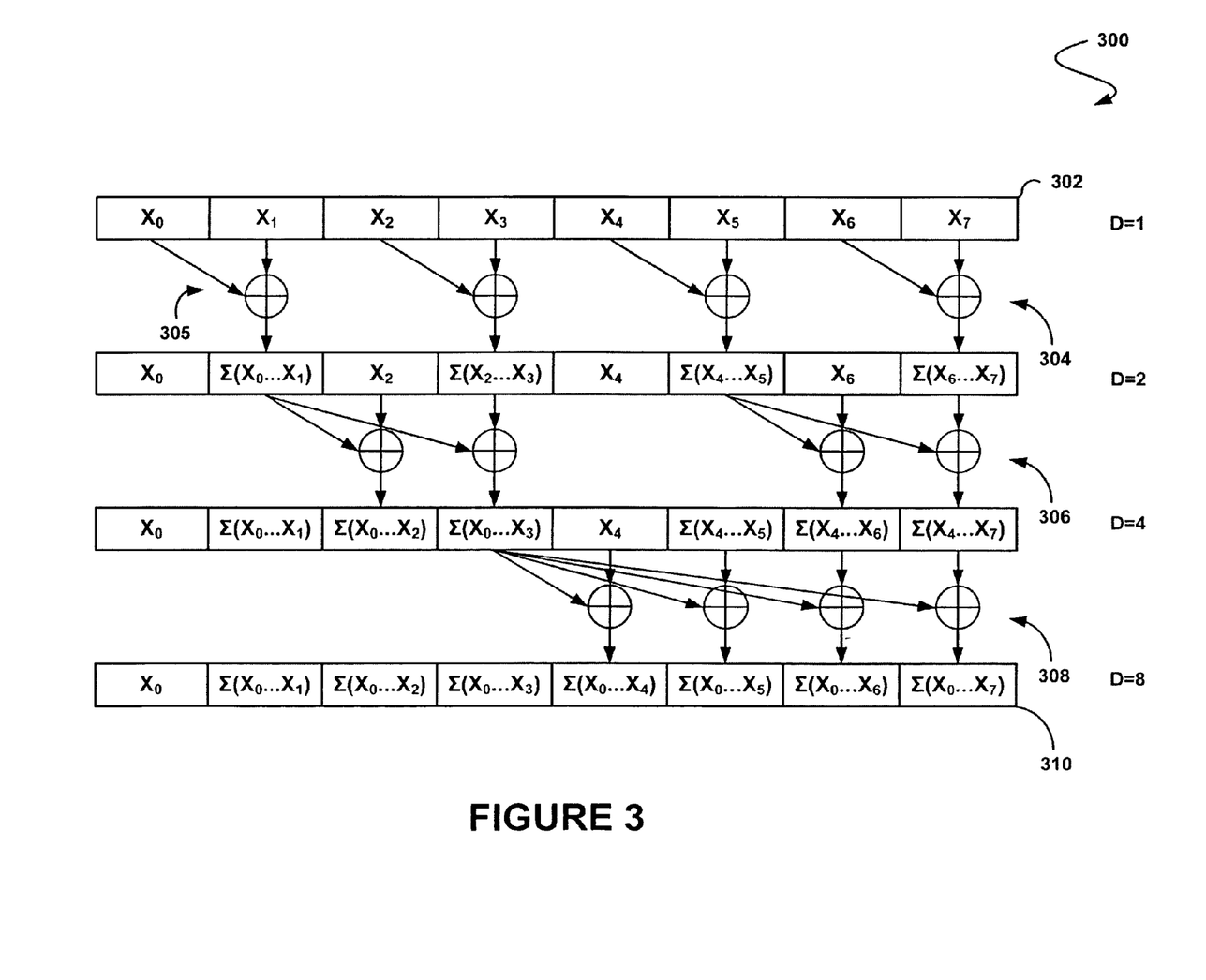
FIG. 3 illustrates an exemplary XOR scan operation, in accordance with another embodiment of the present invention.

An Illustration of another example of operation will be set forth in the context of a embodiment involving an 8-element array shown in FIG. 3.

After operation 208, the variable D is doubled. See operation 210. Thereafter, operation continues in the while loop until the variable D is no longer less than the warp size. See, again, decision 204. In one embodiment, the end of the while loop may result in a termination of the present method. In such embodiment, the result may take the form of an inclusive XOR scan.

In another embodiment, the method may optionally proceed with operation 212 where Expression #2 is carried out, as set forth below.

$$P[idx]=P[idx]-oval, \quad \text{Expression \#2}$$

where oval=P[idx]

It should be noted that the expression "oval=P[idx]" is executed before the loop begins, in operation 202. Otherwise, P[idx] will have a new value computed in the loop, resulting in incorrect results (e.g. all zeros).

In use, the calculation of Expression #2 may serve to transform the inclusive XOR result to an exclusive XOR result. The exclusive scan may refer to a scan where each element j of the result is the sum of all elements up to, but not including element j in the input array. On the other hand, in an inclusive scan, all elements including element j are summed. As set forth in operation 212, an exclusive scan can be generated from an inclusive scan by shifting the resulting array right by one element and inserting the identity. It should be noted that an exclusive scan may refer to a scan where each element j of the result is the sum of all elements up to, but not including j in the input array. On the other hand, an inclusive scan is a scan where all elements, including j, are summed.

In use, the foregoing method may be executed in parallel on multiple threads, and all of the threads within each warp compute the scan of a number of elements equal to the warp size. Using the bitwise XOR operation, the method builds the results of the scan operation by traversing the array in a tree fashion. At each level D of the tree, the method computes the XOR of $2^D$ with the lower D bits of each thread index, in order to compute the address read by the thread. In practice, since the warp size is fixed for a given machine, the while loop in the above method is unrolled.

Exemplary pseudo-code that may be used to implement the foregoing method is set forth in Table 4. Of course, such pseudo-code is set forth for illustrative purposes only and should not be construed as limiting in any manner whatsoever.

TABLE 4

```
warpscan(array P)
{
  Thread-local variables: idx, oval,
  idx = this thread's global index among all active threads
  oval = P[idx]
  D = 1
```

TABLE 4-continued

```
  while (D < warp_size)
    if ((idx AND D) > 0) then
      P[idx] += P[(idx OR (D-1)) XOR D]
    endif
    D = D * 2
  endwhile
  if (this is an exclusive scan)
    P[idx] -= oval
}
```

In one embodiment, the present method may be implemented utilizing any desired programming framework. In one embodiment, such technique may be implemented using a driver for providing general computational capabilities utilizing a graphics processor. An example of such a driver may be provided in conjunction with the CUDA™ framework provided by NVIDIA Corporation. Table 5 illustrates exemplary code for supporting such an implementation. Again, it is strongly noted that such implementation is set forth for illustrative purposes only and should not be construed as limiting in any manner whatsoever.

TABLE 5

```
__device__ warpscan(float* ptr, bool isExclusive)
{
  int idx = threadIdx.x;
  float oval = ptr[idx];
  if(idx&1)  ptr[idx] += ptr[(idx | (1-1)) ^ 1];
  if(idx&2)  ptr[idx] += ptr[(idx | (2-1)) ^ 2];
  if(idx&4)  ptr[idx] += ptr[(idx | (4-1)) ^ 4];
  if(idx&8)  ptr[idx] += ptr[(idx | (8-1)) ^ 8];
  if(idx&16) ptr[idx] += ptr[(idx | (16-1)) ^ 16];
  if (isExclusive)
    ptr[idx] -= oval;
}
```

FIG. 3 shows an exemplary XOR scan operation 300, in accordance with another embodiment of the present invention. As an option, the present scan may represent exemplary operation of the method of FIG. 2. For example, illustrated is a plurality of passes of an element array 302 involving eight elements.

Specifically, a first pass 304 is shown to involve the update of elements 1, 3, 5, 7, etc. The selection of such elements may be dictated by decision 206 of FIG. 2. See, for example, Table 2 above, when D=1. Further, the value of Such replacement is made using a plurality of XOR operations 305, and may be calculated in accordance with operation 208 of FIG. 2. Note, for example, Expression #1.

Operation further continues with a second pass 306 and a third pass 308, in the manner shown. As further illustrated, a final element 310 of the third pass includes a sum of all of the elements of the element array.

As illustrated in FIG. 3, the XOR operations provide for a traversal of the array in a single direction (e.g. downward, etc.), for efficiency purposes. In the context of the present description, such single direction traversal may refer to any traversal that avoids a traversal in an opposite direction which would require additional processing. In the specific context of the embodiment of FIG. 3, a traversal in such opposite direction would involve an upward sweep of the array. Of course, in some embodiments, use of multiple direction traversal is contemplated.

It should be noted that the use of the XOR operation is set forth for illustrative purposes only. Other embodiments are contemplated that use other operators (e.g. minus operator, etc.) for providing functionality similar to that set forth in Table 3. In some embodiments, any suitable traversal scheme may be used.

Figure 4:
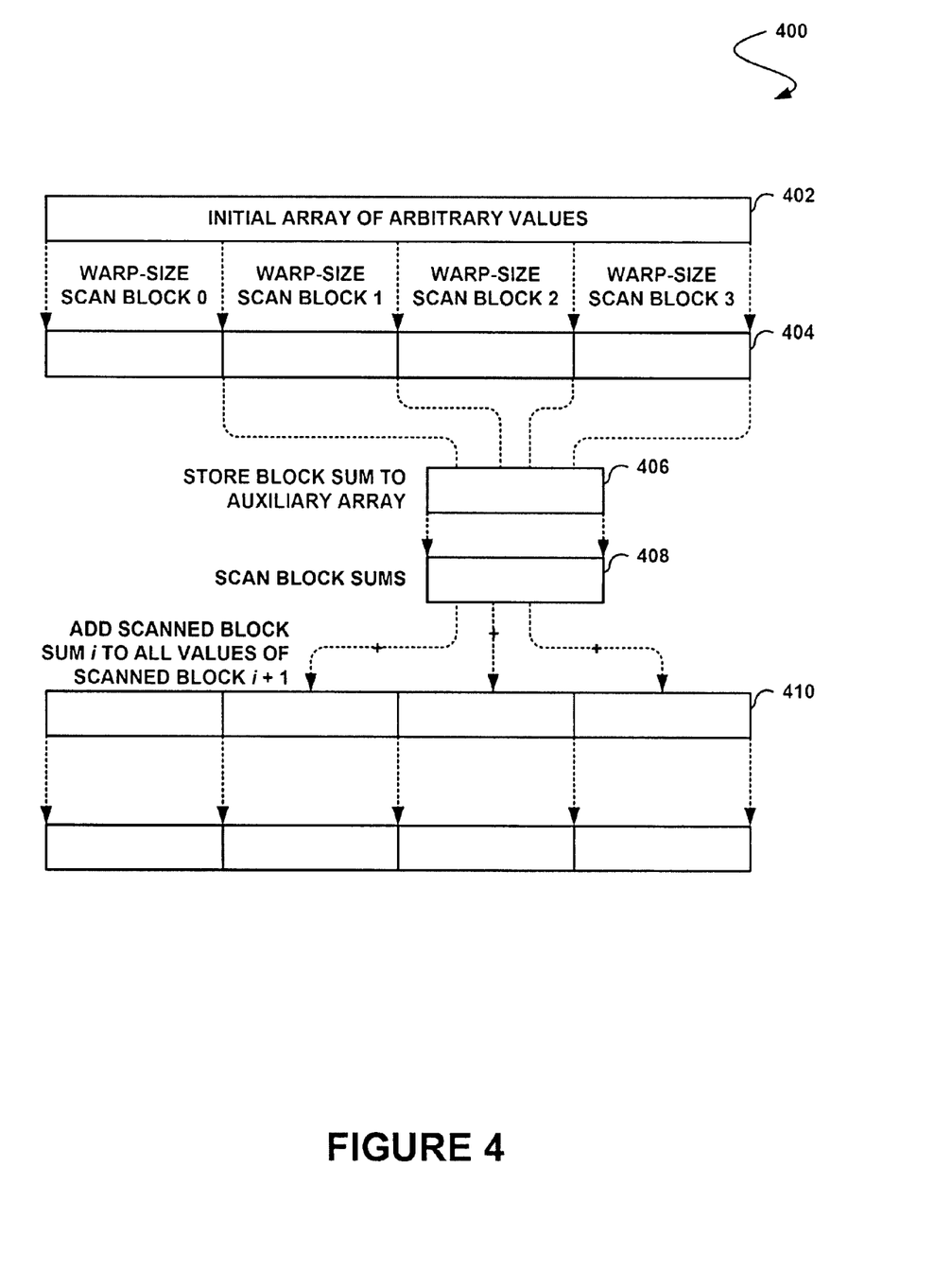
FIG. 4 shows a framework for performing a scan operation on a larger array of elements, in accordance with yet another embodiment of the present invention.

FIG. 4 shows a framework 400 for performing a scan operation on a larger array of elements, in accordance with yet another embodiment of the present invention. As an option, the present framework may be implemented using the functionality and features of FIGS. 1-3. Of course, however, the present framework may be implemented in any desired environment. Again, the aforementioned definitions may apply during the present description.

In the present embodiment, an array of elements 402 may be provided which is too large for processing in the manner set forth in previous figures. Specifically, there may not be enough threads of a particular processor to accommodate the number of elements of the array. In such case, the array of values may be divided into a plurality of blocks 404. Such block size, for example, may include a number of elements that is equal to the number of threads that is capable of being physically run in parallel by a particular processor (e.g. a warp, etc.).

To this end, each of the blocks may be assigned to a warp. By this design, each thread of the warp may be allocated a particular element of a corresponding block. Further, a plurality of processors may each process the elements of the associated block for performing a scan operation. See FIG. 2, for example.

Results of the scan of each block may then be stored in an auxiliary array 406, for use in completing the scan operation. Specifically, a last element of each of the blocks may be stored in such auxiliary array. Still yet, the elements of such auxiliary array may, in turn, be scanned for generating an additional array of scan results 408. Such scan results may then be added to the original scanned blocks 404. In particular, in the case where items 406/408 represent an inclusive scan, a scan result i may be added to each of the elements of the original scanned block i+1, in the manner shown. To this end, a final array of scanned elements is provided. While not shown, in the case where items 406/408 represent an exclusive scan, the scan result i may be added to each of the elements of the original scanned block i. Of course, while the present example involves an addition operator, such operator may, in various embodiments, include, but is certainly not limited to multiplication, maximum, minimum, bit vise AND/OR, etc.

Thus, a single-warp XOR scan operation may be extended to larger arrays. In summary, a prefix sum of a large array A can be computed from many non-overlapping array portions (e.g. prefix sums of subarrays of A), by adding a last element of the result of scanning subarray Ai to every element of the result of scanning subarray Aj. Such property may thus be exploited to design an algorithm that can scan B elements with B threads, where B is a multiple of the warp size.

In one specific example of use, each thread i may load one element from device memory and store it in location i of an array P in shared memory. Then, the above algorithm may be run by all threads on the array P. This results in P now containing B/warp_size subarrays of warp_size elements, each of which contains the prefix sum of the corresponding elements of the input. The last element of each of these subarray scans is then copied by one thread of its corresponding warp w to element w of another shared array, Q (with only B/warp_size) elements. This array is then scanned. Finally, each thread i from warp w=floor (i/warp_size) adds element w of array Q to element i of array P. The array P thus contains the complete prefix scan of the input array.

Again, since the block size is set to include a number of elements that is equal to the warp size (i.e. number of threads that is capable of being physically run in parallel by a particular processor), no synchronization is necessarily required within the scan of blocks. However, while synchronization may be reduced in view of such design, some synchronization may be utilized at various points. For example, synchronization may be performed amongst the threads performing the scan operation on different portions (e.g. blocks, etc.) of the array.

Table 6 sets forth exemplary pseudo-code that may be used to implement the foregoing framework of FIG. 4. As shown, synchronization is provided at various barrier points. Of course, such pseudo-code is set forth for illustrative purposes only and should not be construed as limiting in any manner whatsoever.

TABLE 6

```
scan(array P)
{
    Thread-local variables: idx, ival, oval
    idx = this thread's global index among all active threads
    ival = P[idx]
    BARRIER
    warpscan(P)
    oval = P[idx]
    BARRIER
    if (idx is the last thread in a warp) then
        P[⌊idx / warp_size⌋] = oval + ival
    endif
    BARRIER
    if (idx < warp_size) then
        p[idx] = warpscan(p)
    endif
    BARRIER
    oval += P[⌊idx / warp_size⌋]
    P[idx] = oval
}
```

It should be noted that, in one embodiment, the foregoing "warpscan" function may be run by many warps at the same time in the pseudo-code of Table 6, rather than by just one warp.

In the above pseudo-code, the term "BARRIER" refers to a barrier synchronization point, where all threads should reach before any thread can proceed beyond. In various embodiments, this may be used to avoid write after read (WAR) and read after write (RAW) data hazards.

Similar to previous embodiments, the present technique may be implemented utilizing any desired programming framework. In one possible embodiment, the foregoing functionality may be provided by a driver in conjunction with the aforementioned CUDA™ framework. Table 7 illustrates exemplary code for supporting such an implementation.

TABLE 7

```
__global__ void scan(float *g_odata, float *g_idata)
{
    extern __shared__ float p[ ];
    int idx = threadIdx.x;
    float ival = g_idata[idx];
    p[idx] = ival;
    __syncthreads( );
    float oval = warpscan(p);
    __syncthreads( );
    if ((idx & 31)==31) p[idx >> 5] = oval + ival;
    __syncthreads( );
    if (idx < 32) p[idx] = warpscan(p);
    __syncthreads( );
    oval += p[idx >> 5];
    g_odata[idx] = oval;
}
```

It should be noted that the foregoing scan operation may be used for a variety of applications including, but not limited to sorting (e.g. radix sorting, etc.), lexical analysis, string comparison, polynomial evaluation, stream compaction, building histograms and data structures (e.g. graphs, trees, summed-area tables, etc.) in parallel. Of course, such applications are set forth as examples, as others are contemplated.

Figure 5:
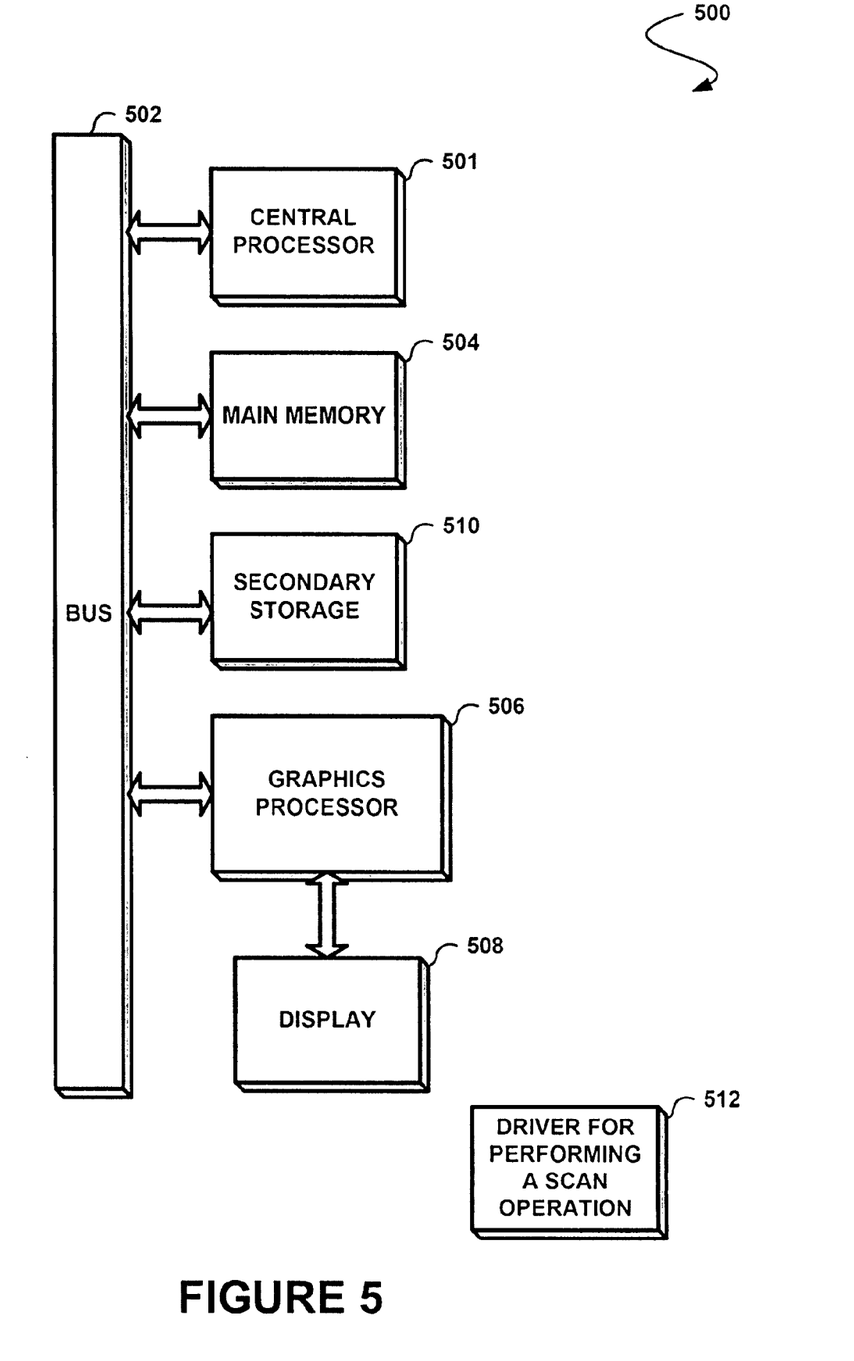
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system is provided including at least one host processor 501 which is connected to a communication bus 502. The system also includes a main memory 504. Control logic (software) and data are stored in the main memory which may take the form of random access memory (RAM).

The system also includes a graphics processor 506 and a display 508, i.e. a computer monitor. In one embodiment, the graphics processor may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system may also include a secondary storage 510. The secondary storage includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter. Further, such scan-related functionality of the various previous figures may, in one possible embodiment, be implemented in any of the foregoing integrated circuits, under the control of a driver 512.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not limited to a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    traversing an array of elements by utilizing a parallel processor architecture including a plurality of processors each capable of physically executing a predetermined number of threads in parallel; and
    executing the predetermined number of threads of at least one of the processors to perform a scan operation involving a number of the elements that is a function of the predetermined number of threads, wherein the function includes a multiple that is at least two.

2. The method of claim 1, wherein the threads each execute a single instruction on different data.

3. The method of claim 1, wherein the parallel processor architecture includes a graphics processor.

4. The method of claim 1, wherein the scan operation includes an all-prefix-sums operation.

5. The method of claim 1, wherein the array of elements is traversed in a single direction.

6. The method of claim 1, wherein the array of elements is traversed utilizing an XOR operation.

7. The method of claim 1, wherein the scan operation is performed on a plurality of portions of the array each including a number of elements equal to the predetermined number.

8. The method of claim 7, wherein the portions of the array are non-overlapping.

9. The method of claim 7, wherein a synchronization is performed amongst the threads performing the scan operation on a first one of the portions, and the threads performing the scan operation on a second one of the portions.

10. The method of claim 7, wherein results of the scan operation performed on the portions of the array are stored.

11. The method of claim 10, wherein the results of the scan operation performed on the portions of the array are used to complete the scan operation.

12. A computer program product embodied on a non-transitory computer readable medium, comprising:
    computer code for traversing an array of elements by utilizing a parallel processor architecture including a plurality of processors each capable of physically executing a predetermined number of threads in parallel; and
    computer code for executing the predetermined number of threads of at least one of the processors to perform a scan operation involving a number of the elements that is a function of the predetermined number of threads, wherein the function includes a multiple that is at least two.

13. The computer program product of claim 12, wherein the computer code is a component of a driver capable of providing general computational capabilities utilizing a graphics processor.

14. The computer program product of claim 12, and further comprising computer code for traversing the array of elements in a single direction.

15. The computer program product of claim 12, and further comprising computer code for traversing the array of elements utilizing an XOR operation.

16. A system, comprising:
- a parallel processor architecture including a plurality of processors each capable of physically executing a predetermined number of threads in parallel; and
- a driver in communication with the parallel processor architecture for executing the predetermined number of threads of at least one of the processors to perform a scan operation involving a number of array elements that is a function of the predetermined number of threads, wherein the function includes a multiple that is at least two.

17. The system of claim 16, wherein the parallel processor architecture is coupled to memory via a bus.

18. The method of claim 1, wherein each of the threads of a particular processor are assigned an element for performing a relevant scan operation.

19. The method of claim 1, wherein each of the threads is assigned exactly one element to perform the scan operation upon, such that all of the threads of a particular processor terminate at the same time.

20. The computer program product of claim 12, wherein the scan operation is performed on a plurality of portions of the array each including a number of elements equal to the predetermined number.

21. The system of claim 16, wherein the scan operation is performed on a plurality of portions of the array each including a number of elements equal to the predetermined number.

22. The system of claim 16, wherein the portions of the array are non-overlapping.

* * * * *